US012118986B2

(12) United States Patent
Magu (10) Patent No.: US 12,118,986 B2
(45) Date of Patent: Oct. 15, 2024

(54) SYSTEM AND METHOD FOR AUTOMATED PROCESSING OF NATURAL LANGUAGE USING DEEP LEARNING MODEL ENCODING (71) Applicant: CONDUENT BUSINESS SERVICES, LLC, Florham Park, NJ (US)

(72) Inventor: Rijul Magu, Morrisville, NC (US)

(73) Assignee: Conduent Business Services, LLC, Florham Park, NJ (US)

( * ) Notice: Subject to any disclaimer, the term of this patent is extended or adjusted under 35 U.S.C. 154(b) by 606 days.

(21) Appl. No.: 17/380,425

(22) Filed: Jul. 20, 2021

(65) Prior Publication Data
US 2023/0025114 A1 Jan. 26, 2023

(51) Int. Cl.
*G10L 15/04* (2013.01)
*G06N 3/08* (2023.01)
*G10L 15/18* (2013.01)
*G10L 15/22* (2006.01)

(52) U.S. Cl.
CPC ............ *G10L 15/1815* (2013.01); *G06N 3/08* (2013.01); *G10L 15/04* (2013.01); *G10L 15/22* (2013.01)

(58) Field of Classification Search
CPC ...................................... G10L 15/04
See application file for complete search history.

(56) References Cited

U.S. PATENT DOCUMENTS

| 8,750,489 | B2 | 6/2014 | Park | |
|---|---|---|---|---|
| 10,592,611 | B2 | 3/2020 | Vig et al. | |
| 2010/0104086 | A1* | 4/2010 | Park | H04M 3/51 |
| | | | | 379/265.09 |
| 2011/0239119 | A1* | 9/2011 | Phillips | G06F 3/0482 |
| | | | | 715/731 |
| 2013/0124213 | A1* | 5/2013 | Scoggins, II | H04N 21/84 |
| | | | | 704/E11.001 |
| 2020/0035228 | A1* | 1/2020 | Seo | G06F 40/295 |

OTHER PUBLICATIONS

Cer et al., "Universal Sentence Encoder," arXiv:1803:11175v2 (2018).
Ester et al., "A Density-Based Algorithm for Discovering Clusters in Large Spatial Databases with Noise, " KDD-96 Proceedings, 96:34:226-231 (1996).

* cited by examiner

*Primary Examiner* — Feng-Tzer Tzeng
(74) *Attorney, Agent, or Firm* — Jones Robb, PLLC (57) ABSTRACT

Automated systems and methods are provided for processing natural language, comprising obtaining first and second digitally-encoded speech representations, respectively corresponding to an agent script for and a voice recording of a telecommunication interaction; generating a similarity structure based on the speech representations, the similarity structure representing a degree of semantic similarity between the speech representations; matching markers in the first speech representation to markers in the second speech representation based on the similarity structure; and dividing the telecommunication interaction into a plurality of sections based on the matching.

20 Claims, 5 Drawing Sheets

FIG. 5

SYSTEM AND METHOD FOR AUTOMATED PROCESSING OF NATURAL LANGUAGE USING DEEP LEARNING MODEL ENCODING

TECHNICAL BACKGROUND

The present disclosure generally describes automated natural language processing methods and systems, and in particular aspects describes systems and methods implementing deep learning models and clustering to process, analyze, and/or section natural language in a telecommunication interaction.

Service (e.g., troubleshooting, feedback acquisition, and so on) is often provided in the form of spoken electronic communication (e.g., telephone, digital voice, video, and so on) between agents and customers or users of a product, business, or organization. Analyzing, understanding, and improving speech in electronic customer interactions is thus important in providing goods and services. This is especially true where goods and services are provided to a large number of customers, as the degree of spoken electronic communication with the customers increases accordingly.

In some examples, customer service agents are provided with pre-defined scripts to guide the spoken electronic communication and to facilitate finding effective solutions to customers' problems. However, it may be unlikely or impractical for each agent to conduct each electronic communication exactly according to the script, owing to the flexible nature of communication and wide range of possible customer problems. As such, various differences exist in the extent to which the scripts are followed and/or the time it takes to move through particular sections or topics included in the scripts. Without an understanding of the duration of the electronic communication, for example, it may be difficult to determine whether electronic resources are being misused or misallocated.

Therefore, such spoken communication is often monitored, recorded, and analyzed to ensure efficient and effective service and/or to prevent inefficient and ineffective use of resources. The analysis may permit the derivation of metrics indicative of how well the script was followed, time periods involved for each section and the overall spoken communication, and the like.

Overview

Various aspects of the present disclosure provide for automated natural language processing systems, devices, and methods which implement deep-learning-based semantic matching and clustering to analyze telecommunication interactions.

In one exemplary aspect of the present disclosure, there is provided a computer-implemented method for processing natural language, comprising: obtaining a first digitally-encoded speech representation corresponding to an agent script for a telecommunication interaction; obtaining a second digitally-encoded speech representation corresponding to a voice recording of the telecommunication interaction; generating a similarity structure based on the first digitally-encoded speech representation and the second digitally-encoded speech representation, the similarity structure representing a degree of semantic similarity between the first digitally-encoded speech representation and the second digitally-encoded speech representation; matching at least one first marker in the first digitally-encoded speech representation to at least one second marker in the second digitally-encoded speech representation based on the similarity structure; and dividing the telecommunication interaction into a plurality of sections based on the matching.

In another exemplary aspect of the present disclosure, there is provided a computing system for processing natural language, the system comprising: at least one electronic processor; and a non-transitory computer-readable medium storing instructions that, when executed by the at least one electronic processor, cause the at least one electronic processor to perform operations comprising: obtaining a first digitally-encoded speech representation corresponding to an agent script for a telecommunication interaction; obtaining a second digitally-encoded speech representation corresponding to a voice recording of the telecommunication interaction; generating a similarity structure based on the first digitally-encoded speech representation and the second digitally-encoded speech representation, the similarity structure representing a degree of semantic similarity between the first digitally-encoded speech representation and the second digitally-encoded speech representation; matching at least one first marker in the first digitally-encoded speech representation to at least one second marker in the second digitally-encoded speech representation based on the similarity structure; and dividing the telecommunication interaction into a plurality of sections based on the matching.

In this manner, various aspects of the present disclosure effect improvements in the technical fields of speech signal processing, as well as related fields of voice analysis and recognition, e-commerce, audioconferencing, and/or videoconferencing.

BRIEF DESCRIPTION OF THE DRAWINGS

These and other aspects of the present disclosure are exemplified by the following Detailed Description, which may be read in view of the associated drawings, in which.

DETAILED DESCRIPTION

The present disclosure provides for systems, devices, and methods which may be used to process natural language in a variety of settings. While the following detailed description is presented primarily in the context of a customer-service interaction, this presentation is merely done for ease of explanation and the present disclosure is not limited to only such settings. For example, practical implementations of the present disclosure include remote education sessions, such as online classes, foreign language apps, and the like; spoken training programs, such as employee onboarding sessions, diversity training, certification courses, and the like; and so on.

As used herein, an "agent" may be any user- or customer-facing entity capable of conducting or facilitating a spoken conversation. The agent may be or include a human customer service representative, a chatbot, a virtual assistant, a text-to-speech system, a speech-to-text system, or combinations thereof. A "telecommunication interaction" may include any remote, natural language-based interaction between the agent and the customer. The telecommunication interaction may be a telephone call, an audioconference, a videoconference, a web-based audio interaction, a web-based video interaction, a multimedia message exchange, or combinations thereof.

As noted above, many business telecommunication interactions are provided in the form of spoken electronic communication between agents and customers or users. Due to variances between agents and customers, it is often not possible to conduct each electronic communication strictly according to a script. Where agents deviate substantially from the script, take excessive amounts of time to complete the script, and/or complete sections of the script out of order, the efficiency of the telecommunications interactions may decrease and/or the telecommunications interactions may result in customer dissatisfaction. As a result, and in view of the large number of telecommunication interactions typically conducted by a given business or other entity, deviations may result in excessive and/or inefficient use of limited electronic resources such as network bandwidth, processing capability, memory and other resources, agent workstations, battery or other power capacity, and so on. To ensure efficient and appropriate use of such electronic resources, the present disclosure provides for systems and methods implementing deep learning models and clustering to process, section, and/or further analyze natural language in a telecommunication interaction.

Figure 1:
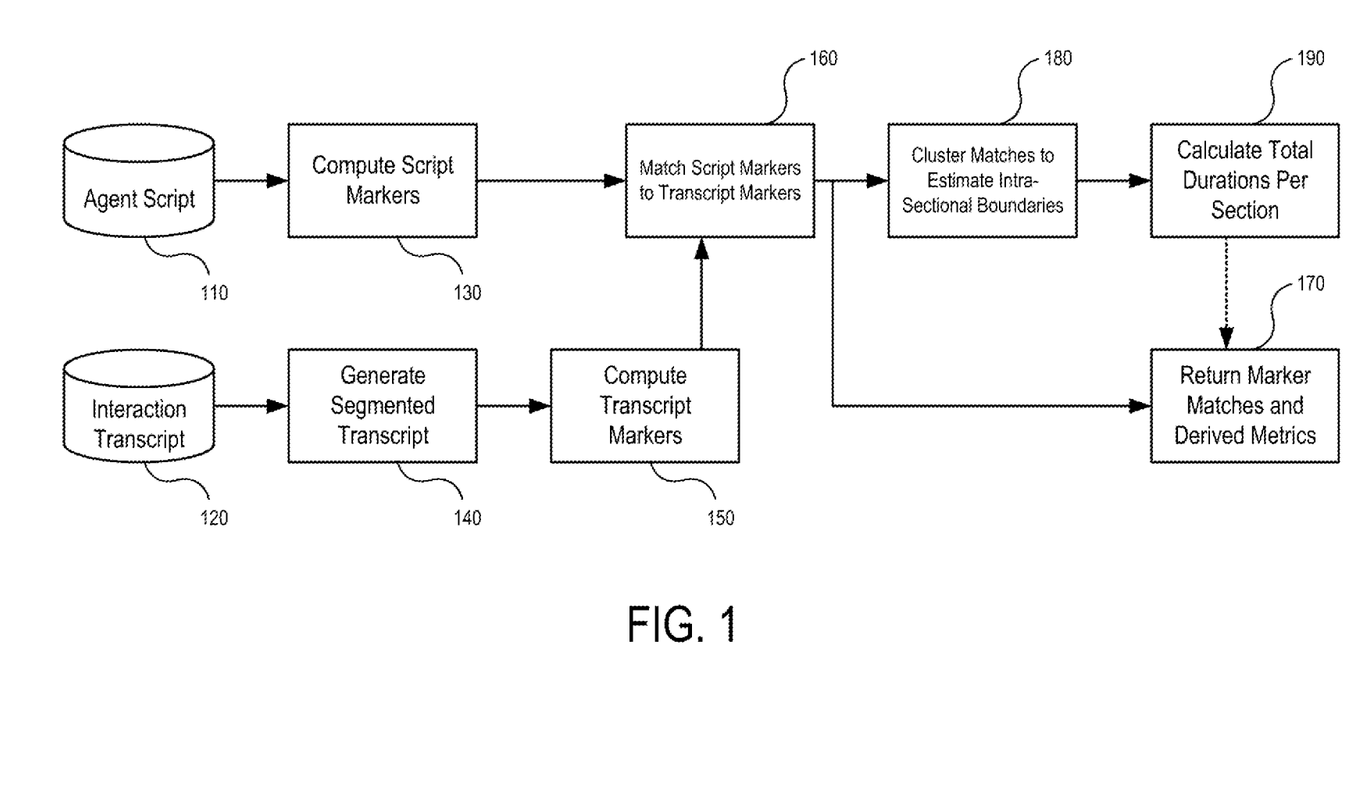
FIG. 1 illustrates an exemplary analysis pipeline according to various aspects of the present disclosure.

These and other benefits may be provided by providing systems and/or methods according to the present disclosure. FIG. 1 illustrates an exemplary process pipeline for such systems and/or methods. As illustrated in FIG. 1, the pipeline begins by obtaining at least two inputs for a telecommunication interaction: a first input 110 based on an agent script and a second input 120 based on an interaction transcript. The inputs may correspond to digitally-encoded representations of speech (either actual or expected), and may be embodied in one or more of several different forms, including but not limited to audio recordings, video recordings, textual transcriptions of audio and/or video recordings, encrypted data structure representing recordings or transcriptions thereof, metadata for any of the foregoing forms, and so on.

The agent script may be a script that an agent is expected or intended to follow during telecommunication interactions. The agent script may be composed of a plurality of logical sections, each of which are directed to specific phases of a lifecycle of the interaction. For example, the logical sections may include an opening/greeting, demographics identification or other detail gathering, equipment identification, security questions, problem articulation, diagnostics, fix deployment, customer satisfaction questions or other feedback, holds, transfers, a pre-closing, and/or a closing. Each section in turn may consist of a variable number of markers (e.g., questions or statements) relating to the theme of the section. For example, the demographics identification section may include questions such as "what is your name?" or "what is your phone number?" to assist with customer identification. Generally, the agent script is intended for use by multiple different agents across multiple different telecommunication interactions, and is predetermined prior to the interaction. In some implementations, different agent scripts may be provided or available depending on the type of interaction (e.g., sales calls vs. service calls). In practice, the agent may deviate from the questions in a given section or may ask the same questions using different wording (e.g., "how old are you?" vs. "what is your age?") or in a different order.

The interaction transcript may be the actual transcript of a specific telecommunication interaction between the agent and a customer. Each interaction transcript may contain the full spoken conversation (e.g., all utterances by both the agent and the customer) or only part of the spoken conversation (e.g., only utterances by the agent). The interaction transcript may further include timestamps corresponding to each utterance. Unlike the agent script, each interaction transcript is generally unique.

Obtaining the inputs may include receiving the scripts (or digitally-encoded speech representations corresponding thereto) from a local database, a remote server, or combinations thereof. Obtaining the inputs may also include converting data from one digitally-encoded speech representation format (e.g., a recording) to another (e.g., a text-based file). The inputs may be obtained in advance or in real-time (i.e., at the time of the spoken conversation). In some implementations, the first input may be obtained in advance and the second input may be obtained in real-time. The inputs are then processed to generate a plurality of markers. The markers are a numerical (e.g., binary, octal, decimal, hexadecimal, etc.) representation of the spoken conversation in a given script or transcript. In the particular illustration of FIG. 1, the first input 110 is provided in the form of a text file and the second input 120 is provided in the form of a voice recording. With reference to the agent script, the markers may correspond to questions which the agent is expected to ask and/or comments the agent is expected to make. With reference to the transcript, the markers may correspond to actual utterances by the agent. Therefore, the pipeline may at operation 130 directly compute the script markers but may require an additional operation 140 of generating a segmented text-based transcript prior to an operation 150 of computing the transcript markers. In implementations where the transcript includes utterances by both the agent and the customer, operation 140 may include distinguishing between agent utterances and customer utterances.

In operations 130 and/or 150, the markers may be generated by using an embedding representation for each piece of spoken conversation. In one example, the markers may be generated by using a Universal Sentence Encoder (USE) embedding representation. USE is a pretrained deep learning model (a machine learning algorithm) that processes a sequence of arbitrary length (e.g., sentences) to return fixed-size numeric vectors representing the sequence. These representations hold semantic information which can be tested and/or processed by evaluating the similarity between vectors of two semantically-equivalent sentences. The model is trained such that the similarity values are relatively high for semantically-equivalent sentences and relatively low for semantically-inequivalent sentences. Operation 130 may also include identifying an expected order of the expected agent utterances and, in some implementations, generating data (e.g., flags, index variables, etc.) of each expected utterance's ordinal position. Operation 150 may also include identifying an actual order of the actual agent utterances and, in some implementations, generating data (e.g., flags, index variables, etc.) of each actual utterance's ordinal position.

Because the agent script may be used for many different individual telecommunication interactions, operation 130 may be performed in advance and the markers then stored for future use. In operation 150, the system implementing the pipeline may process the segmented interaction transcript by first breaking the text into constituent sentences. In some implementations, each sentence may further be broken into smaller equal-length parts. This may provide additional functionality or robustness where the agent speaks in long sentences or where noise in operation 140 results in longer or run-on sentences. Each sentence and their constituent parts may be passed through the USE module to retrieve the respective embeddings.

The similarity may then be evaluated in operation 160 using vector operations, such as a dot product, to match markers in the agent script to markers in the transcript. For example, where the sequences of the agent script are represented by the exemplary numeric vector $v_s$ and the sequences of the interaction transcript are represented by the exemplary numeric vector $v_t$, the similarity may be evaluating $v_s \cdot v_t$. The vector $v_s$ and/or the vector $v_t$ may have a predetermined (fixed) size. The resultant is a similarity matrix of similarity values with N rows, where N is the number of utterances, and M columns, where M is the number of script markers. Thus, the matrix includes M×N matrix elements each corresponding to one of the similarity values. Each section marker may then be compared to a similarity threshold value to facilitate discarding matches that are very dissimilar. The threshold value may be predetermined and/or tuned. In one particular example, the threshold value may correspond to 70% similarity.

At this point, the marker matches and metrics derived therefrom (e.g. timestamps, conversation flow diagrams, speech timelines, and so on) may be output or returned to the user at operation 170. The output may indicate the final matches found in the transcript per marker per section in the script, and may identify or otherwise provide information regarding which markers were missed, repeated, or asked out of order. For example, operation 170 may identify discrepancies between the number of expected instances of questions and the number of actual instances of questions and/or between the expected order of questions and the actual order of questions. Some examples of such output will be described in more detail below with regard to FIGS. 3-5.

At operation 180, the pipeline may cluster matches to estimate intra-sectional boundaries and time lengths. This may be performed on a section-by-section basis. Operation 180 may include applying a clustering algorithm to the output of operation 160. In one example, operation 170 includes applying a density-based spatial clustering of applications with noise (DBSCAN) algorithm over the start timestamps of each utterance that was matched with one of the markers belonging to the section under consideration. The DBSCAN algorithm may utilize two parameters: an expected point spread parameter corresponding to the maximum distance of separation between two points for the points to be considered as neighboring, and a minimum samples parameter corresponding to the minimum number of points required for a cluster to form. One or both of these parameters may be predetermined or may be tuned.

After clustering, at operation 190 the pipeline may calculate total durations per section. This may include determining the timestamp corresponding to the start of each section, determining the timestamp corresponding to the end of each section, and obtaining the time difference therebetween. This may also include determining one or more intermediate timestamps (e.g., corresponding to a time in which a customer is placed on hold or removed from hold). While FIG. 1 illustrates operation 170 as occurring after operation 160, in some implementations operation 170 may instead occur after operation 190 and therefore further include information corresponding to the total durations. In other implementations operation 170 may occur in stages, with a first output occurring after operation 160 and a second output occurring after operation 190.

Figure 2:
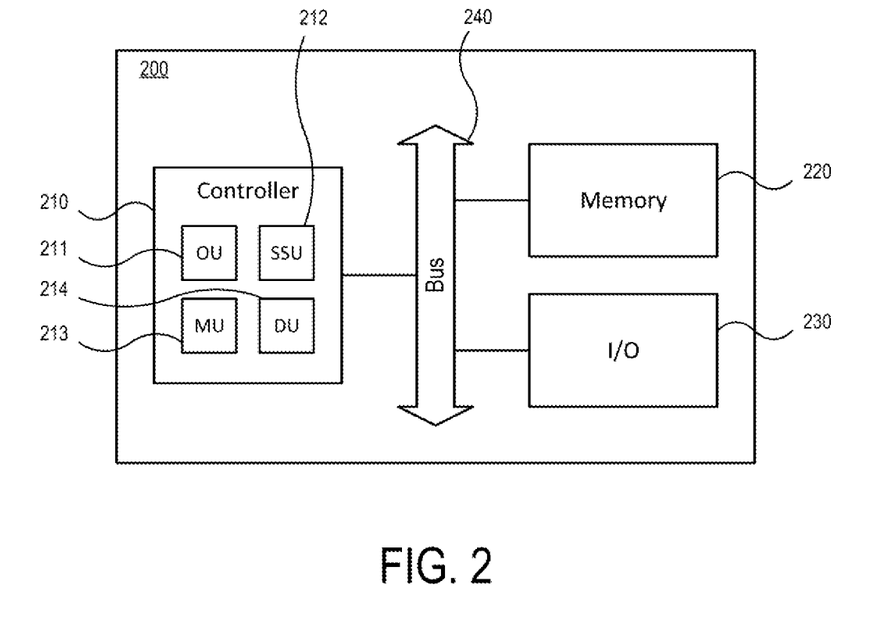
FIG. 2 illustrates an exemplary natural language processing system according to various aspects of the present disclosure.

The pipeline of FIG. 1 (or other pipelines consistent with the present disclosure) may be implemented using a natural language processing device or natural language processing system. FIG. 2 illustrates an exemplary natural language processing system 200. The natural language processing system 200 includes an electronic processor 210, a memory 220, and input/output (I/O) circuitry 230, each of which communicate with one another via a bus 240. The processor 210 may be or include one or more microprocessors and/or one or more cores. In one implementation, the processor 210 is a central processing unit (CPU) of the natural language processing system 200.

The processor 210 may include circuitry configured to perform certain operations. As illustrated, the processor includes an obtaining unit 211, a similarity structure unit 212, a matching unit 213, and a dividing unit 213. Each of the units 211-213 may be implemented via dedicated circuitry in the processor 210, via firmware, via software modules loaded from the memory 220, or combinations thereof.

The obtaining unit 211 may be configured to perform operations including obtaining a first digitally-encoded speech representation corresponding to an agent script for a telecommunication interactions and/or obtaining a second digitally-encoded speech representation corresponding to a voice recording of the telecommunication interaction. These operations may be the same as or similar to some or all of operations 110-150 illustrated in FIG. 1. The similarity structure unit 212 may be configured to perform operations including generating a similarity structure based on the first digitally-encoded speech representation and the second digitally-encoded speech representation, the similarity structure representing a degree of semantic similarity between the first digitally-encoded speech representation and the second digitally-encoded speech representation. These operations may be the same as or similar to operation 160 illustrated in FIG. 1.

The matching unit 213 may be configured to perform operations including matching at least one first marker in the first digitally-encoded speech representation to at least one second marker in the second digitally-encoded speech representation based on the similarity structure. The matching unit 213 may also be configured to determine that there is no match for any given first marker; for example, if the agent failed to ask a given question or make a given statement. The matching unit 213 may be configured to determine that there is no match for all first markers in a given section; for example, if the agent skipped the section altogether. The matching unit 213 may further be configured to determine whether any script questions were asked out of order; for example, by identifying discrepancies between the expected order of questions and the actual order of questions. These operations may be the same as or similar to operation 180 illustrated in FIG. 1. The dividing unit 214 may be configured to perform operations including dividing the telecommunication interaction into a plurality of sections based on the matching. These operations may be the same as or similar to operation 180 and/or operation 190 illustrated in FIG. 1.

The memory 220 may be any computer-readable storage medium (e.g., a non-transitory computer-readable medium), including but not limited to a hard disk, a Universal Serial Bus (USB) drive, a removable optical medium (e.g., a digital versatile disc (DVD), a compact disc (CD), etc.), a removable magnetic medium (e.g., a disk, a storage tape, etc.), and the like, and combinations thereof. The memory 220 may include non-volatile memory, such as flash memory, read-only memory (ROM), erasable programmable read-only memory (EPROM), electrically erasable programmable read-only memory (EEPROM), a solid-state device (SSD), and the like; and/or volatile memory, such as random access memory (RAM), dynamic RAM (DRAM), double data rate synchronous DRAM (DDRAM), static RAM (SRAM), and the like. The memory 220 may store instructions that, when executed by the processor 210, cause the processor 210 to perform various operations, including those disclosed herein.

The I/O circuitry 230 may include circuitry and interface components to provide input to and output from the natural language processing system 200. The I/O circuitry 230 may include communication circuitry to provide communication with devices external to or separate from the natural language processing system 200. The communication circuitry may be or include wired communication circuitry (e.g., for communication via electrical signals on a wire, optical signals on a fiber, and so on) or wireless communication circuitry (e.g., for communication via electromagnetic signals in free space, optical signals in free space, and so on). The communication circuitry may be configured to communicate using one or more communication protocols, such as Ethernet, Wi-Fi, Li-Fi, Bluetooth, ZigBee, WiMAX, Universal Mobile Telecommunications System (UMTS or 3G), Long Term Evolution (LTE or 4G), New Radio (NR or 5G), and so on.

The I/O circuitry 230 may further include user interface (UI) circuitry and interface components to provide interaction with a user. For example, the UI may include visual output devices such as a display (e.g., a liquid crystal display (LCD), and organic light-emitting display (OLED), a thin-film transistor (TFT) display, etc.), a light source (e.g., an indicator light-emitting diode (LED), etc.), and the like; and/or audio output devices such as a speaker. The UI may additionally or alternatively include visual input devices such as a camera; audio input devices such as a microphone; and physical input devices such as a button, a touchscreen, a keypad or keyboard, and the like. In some implementations, the I/O circuitry 230 itself may not include the input or output devices, but may instead include interfaces or ports configured to provide a connection external devices implementing some or all of the above-noted inputs and outputs. These interfaces or ports may include Universal Serial Bus (USB) ports, High-Definition Multimedia Interface (HDMI) ports, Mobile High-Definition Link (MDL) ports, FireWire ports, DisplayPort ports, Thunderbolt ports, and the like.

The I/O circuitry 230 may be used to output various data structures, including but not limited to raw data, marker matches, derived metrics, visualizations, and so on. These output operations may be the same as or similar to operation 170 illustrated in FIG. 1. In one particular example, the I/O circuitry 230 may output a call visualization timeline, examples of which are illustrated in FIGS. 3-5.

Figure 3:
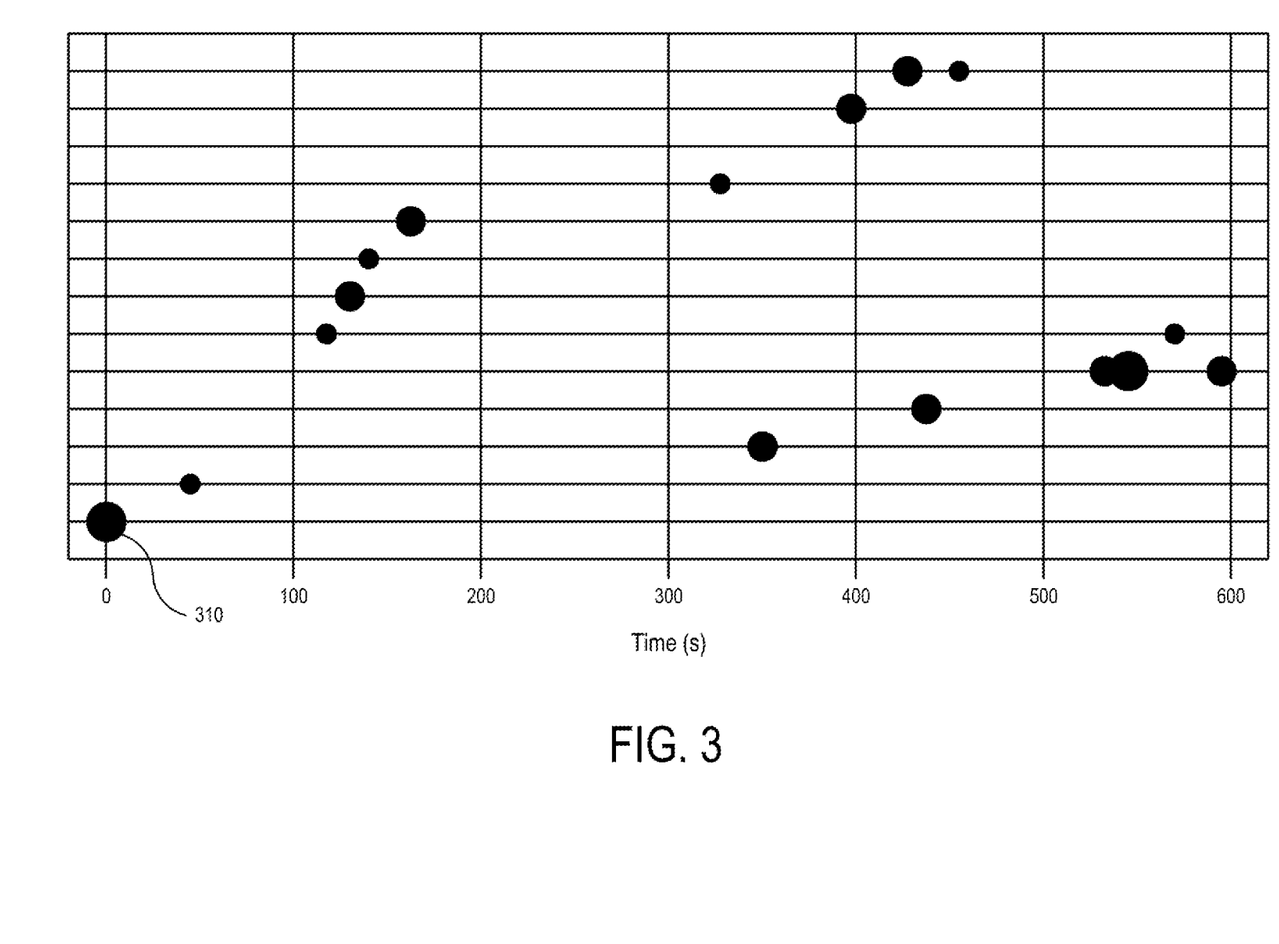
FIGS. 3-5 illustrate exemplary natural language timelines according to various aspects of the present disclosure.
Figure 4:
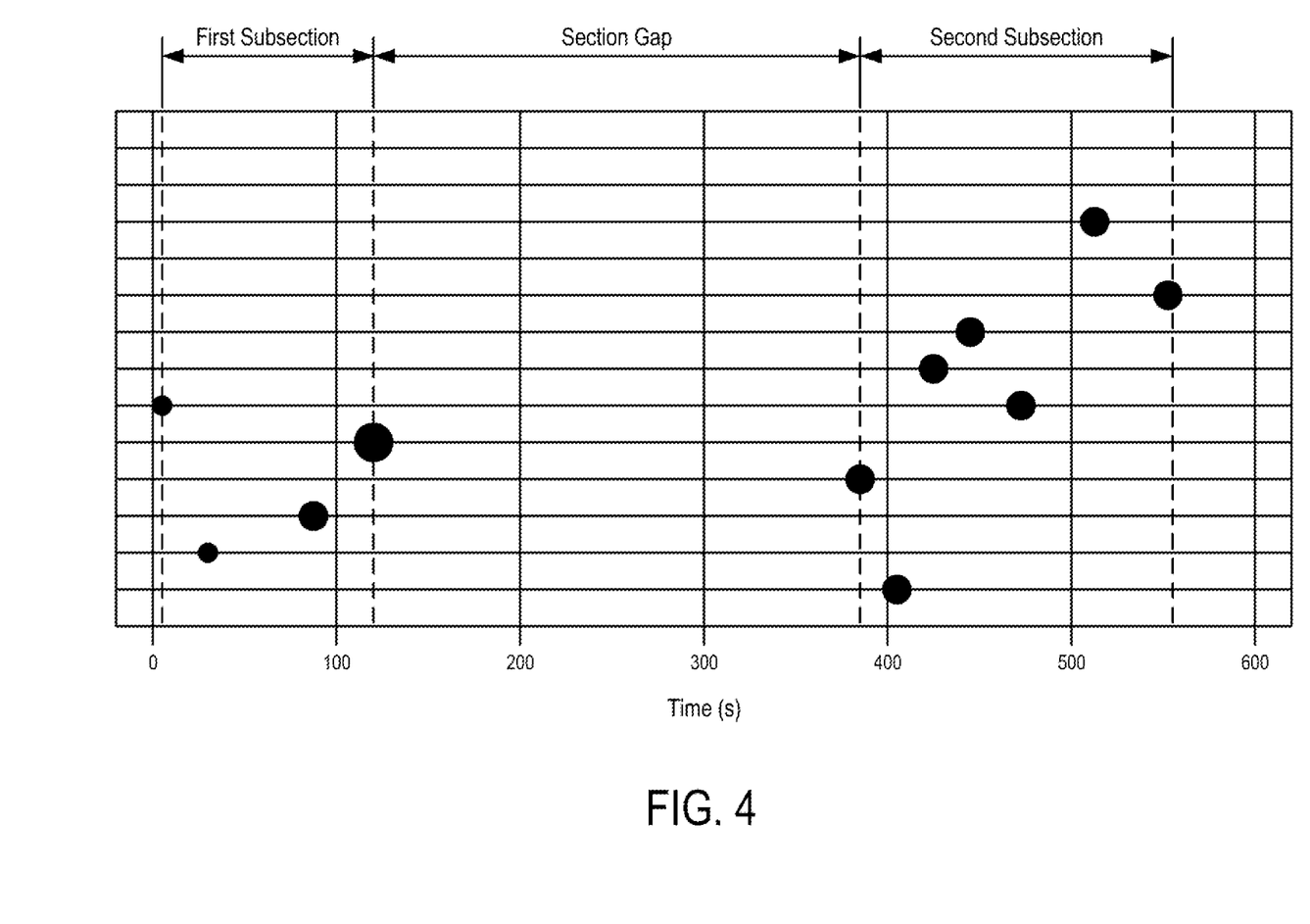
Figure 5:
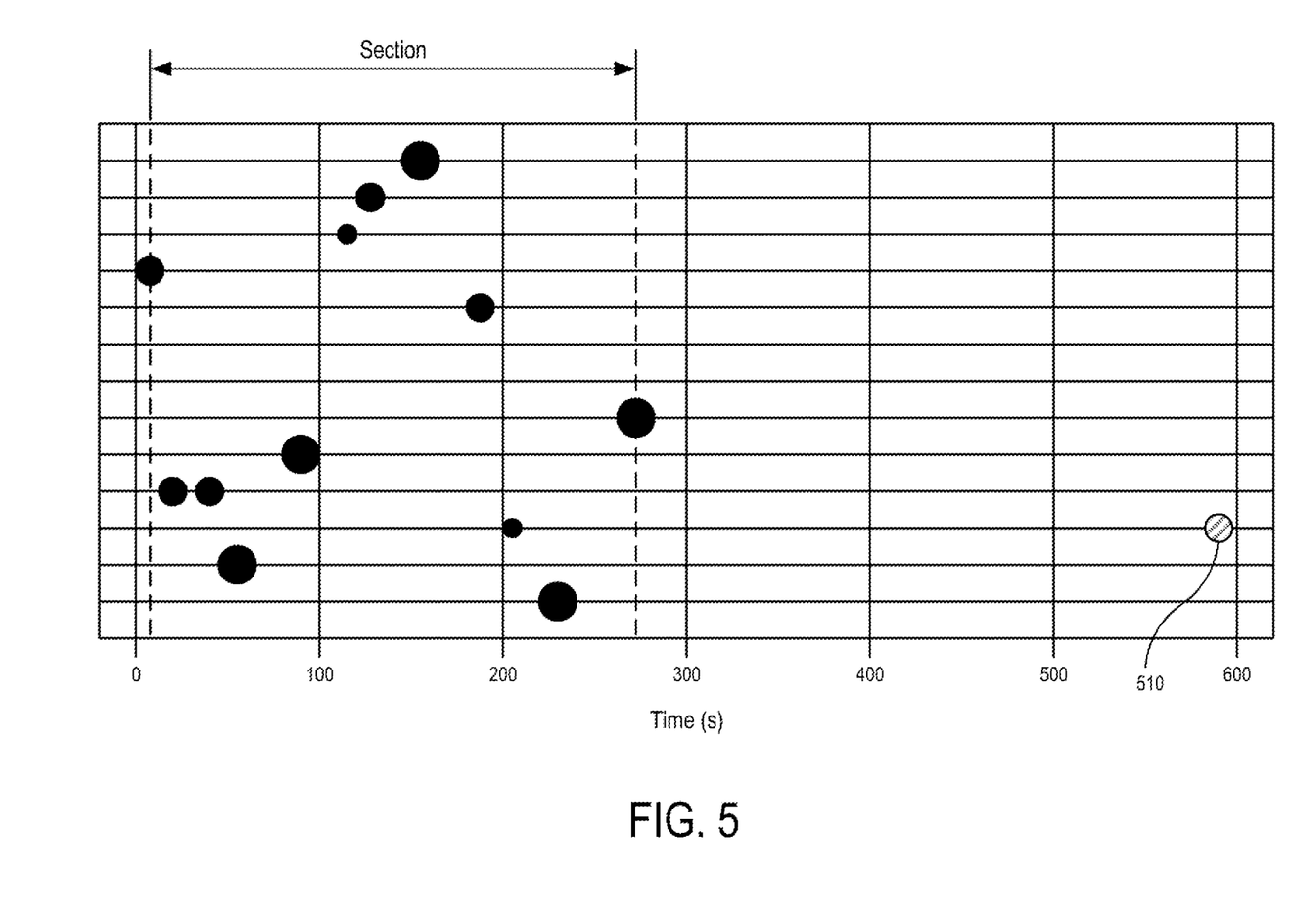

In each of FIGS. 3-5, the horizontal axis corresponds to time in seconds (s) and the vertical axis corresponds to distinct markers within a section. While each only illustrates a single section, in practice the visualizations may include multiple sections. Methods according to the present disclosure may perform semantic matching between the agent script and the call transcript as described herein. For each marker in the call transcript (corresponding to an actual utterance), a corresponding marker in the agent script (corresponding to an expected utterance) may be determined. Therefore, at a time corresponding to the marker in the call transcript, a circle 310 is placed at a line corresponding to the marker in the agent script when a match is found (i.e., for a matched actual utterance). The size of the circle in FIGS. 3-5 illustrates a strength of the match, such that larger circles indicate a higher degree of confidence in semantic matching between the actual utterance and the expected utterance. However, because a similarity threshold may be used to discard matches with a low degree of similarity, even the smaller circles in FIGS. 3-5 indicate a semantic match with a sufficient degree of confidence.

FIG. 3 illustrates a bare visualization of the call timeline. In this particular example, the section begins at t=0 s with the first matched actual utterance by the agent, illustrated as the large circle 310 placed on the first horizontal line along the vertical axis. This indicates that the first matched actual utterance corresponds to the first expected utterance with a high degree of certainty. The section continues at t~50 s with the second matched actual utterance by the agent, illustrated as a small circle placed on the second horizontal line along the vertical axis. This indicates that the second matched actual utterance corresponds to the second expected utterance with a smaller degree of certainty.

The next circle, at t~110 s, is placed on the sixth horizontal line along the vertical axis. This may indicate that the agent skipped several expected questions or asked certain questions out of order. For example, FIG. 3 shows a circle on the third vertical line at t~350 s, indicating that the agent asked the third expected utterance later in the section. Some vertical lines (e.g., the fifth in FIG. 3) include multiple circles. This may indicate that the agent repeated the corresponding marker. For example, the customer may not have understood a question and therefore the agent may have repeated it and/or rephrased it. Some vertical lines (e.g., the eleventh in FIG. 3) include no circles. This may indicate that the agent skipped the corresponding marker entirely.

The call visualization timeline may further include timestamps corresponding to the beginning of the section and the end of the section, and/or may include an indication of the section duration. In FIG. 3, the section duration is simply the end-of-section time minus the beginning-of-section time, or ~595 s. This is the case for the particular example illustrated in FIG. 3 because the section was uninterrupted and because all points shown on the call visualization timeline correspond to the section being processed.

As noted above, the DBSCAN algorithm may utilize two parameters: an expected point spread parameter corresponding to the maximum distance of separation between two points for the points to be considered as neighboring, and a minimum samples parameter corresponding to the minimum number of points required for a cluster to form. As a result of these parameters, it may be possible to determine that a particular section includes two (or more) distinct clusters of markers and/or to determine that a particular marker is an outlier which should not be included in the section.

FIG. 4 illustrates a divided visualization of the call timeline. In this example, the section begins at t~5 s with the first matched actual utterance by the agent and continues with several additional matched actual utterances. There is a large temporal gap between the fourth matched actual utterance at t~120 s and the fifth matched actual utterance at t~385 s. In practical implementations, this gap may correspond to situations in which the agent places the customer on hold, the agent temporarily transfers the customer to another department, the customer must step away from the telecommunication interaction briefly (e.g., to answer the door or take another call), the agent moved on and later returned to the section, and so on.

The algorithm may determine that this gap exceeds the expected point spread parameter and thus that the fifth matched actual utterance belongs to a different group than the fourth matched actual utterance. The algorithm may further determine that each group has a population exceeding the minimum samples parameter, and thus that each group is a cluster. As such, the illustrated example includes a first cluster (the first through fourth marker) and a second cluster (the fifth through eleventh marker).

In FIG. 4, the call visualization timeline includes timestamps corresponding to the beginning of the section, the beginning of the gap, the end of the gap, and the end of the section. To determine the section duration, the algorithm may take the total section duration (i.e., the end-of-section time minus the beginning-of-section time) and subtract the gap duration (i.e., the end-of-gap time minus the beginning-of-gap time); alternatively, the algorithm may find the first subsection duration (i.e., the beginning-of-gap time minus the beginning-of-section time) and add the second subsection duration (i.e., the end-of-section time minus the end-of-gap time). While FIG. 4 illustrates a single gap between two subsections, in practice any number of gaps and subsections may be present as determined by the expected point spread parameter and the minimum samples parameter.

FIG. 5 illustrates an outlier-exhibiting visualization of the call timeline. In this example, the section begins at t~5 s with the first matched actual utterance by the agent and continues with several additional matched actual utterances. There is a large temporal gap between the twelfth matched actual utterance at t~270 s and the thirteenth matched actual utterance at t~590 s. Moreover, the thirteenth matched actual utterance is the final matched actual utterance. In FIG. 5, this utterance is identified by a hatched circle 510. In practical implementations, this gap may correspond to situations in which a particular marker has been classified as belonging to a particular section inadvertently. For example, if the section corresponds to demographic information, the final marker may correspond to the agent asking "I'm sorry, what was your name again?" before concluding the call. If this marker were included in the determination of the demographic section duration, the algorithm may erroneously conclude that the demographic section had a duration many times larger than the actual duration.

Thus, the algorithm may determine that the gap exceeds the expected point spread parameter and thus that the thirteenth matched actual utterance belongs to a different group than the twelfth matched actual utterance. However, because the later group includes only a single marker, the algorithm may determine that it has a population which does not exceed the minimum samples parameter and therefore that this group is not a cluster. As such, the illustrated example includes a single cluster (the first through twelfth marker) and the outlier circle 510. In determining the duration of the section, the algorithm may disregard the outlier circle 510 entirely and use only the timestamp corresponding to the beginning of the section and the beginning of the gap. While FIG. 5 illustrates a single outlier and a single subsection, in practice any number of outliers and subsections may be present as determined by the expected point spread parameter and the minimum samples parameter. Moreover, the algorithm may determine both gaps (e.g., as illustrated in FIG. 4) and outliers (e.g., as illustrated in FIG. 5) in a single operation.

While each section has been separately illustrated for clarity in FIGS. 3-5, in practice a single telecommunication interaction may include multiple sections. Moreover, different sections may intersect or overlap.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention, and are intended to be illustrative and not restrictive. Many embodiments and applications other than the examples provided would be apparent to those skilled in the art upon reading the above description. The scope should be determined, not with reference to the above description, but instead with reference to the appended claims, along with the full scope of equivalents to which such claims are entitled. It is anticipated and intended that future developments will occur in the technologies discussed herein, and that the disclosed systems and methods will be incorporated into future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, the use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method for processing natural language, comprising:

obtaining a first digitally-encoded speech representation corresponding to an agent script for a telecommunication interaction;

obtaining a second digitally-encoded speech representation corresponding to a voice recording of the telecommunication interaction;

generating a similarity structure based on the first digitally-encoded speech representation and the second digitally-encoded speech representation, the similarity structure representing a degree of semantic similarity between the first digitally-encoded speech representation and the second digitally-encoded speech representation;

matching at least one first marker in the first digitally-encoded speech representation to at least one second marker in the second digitally-encoded speech representation based on the similarity structure, wherein matching further comprises identifying discrepancies between an order of markers of first digitally-encoded speech representation and an order of markers of second digitally-encoded speech representation; and dividing the telecommunication interaction into a plurality of sections based on the matching.

2. The method according to claim 1, wherein obtaining the first digitally-encoded speech representation includes applying a machine learning algorithm to the agent script to generate the first digitally-encoded speech representation, wherein the first digitally-encoded speech representation is a first numeric vector having a predetermined size.

3. The method according to claim 2, wherein obtaining the second digitally-encoded speech representation includes:

generating a transcript from the voice recording; and applying the machine learning algorithm to the transcript to generate the second digitally-encoded speech representation, wherein the first digitally-encoded speech representation is a second numeric vector having the predetermined size.

4. The method according to claim 3, wherein generating the similarity structure includes applying a vector operation to the first numeric vector and the second numeric vector, thereby to generate a similarity matrix including a plurality of matrix elements.

5. The method according to claim 4, wherein matching the at least one first marker to the at least one second marker includes:

comparing the plurality of matrix elements to a predetermined similarity threshold value; and discarding respective ones of the plurality of matrix elements which are less than the similarity threshold value.

6. The method according to claim 5, wherein dividing the telecommunication interaction into the plurality of sections includes:

applying a clustering algorithm to each of the plurality of matrix elements which have not been discarded; and generating at least one section start timestamp and at least one section stop timestamp.

7. The method according to claim 1, wherein the first digitally-encoded speech representation includes a first plurality of embeddings respectively corresponding to a plurality of expected utterances in the telecommunication interaction, and the second digitally-encoded speech representation includes a second plurality of embeddings respectively corresponding to a plurality of actual utterances in the telecommunication interaction.

8. The method according to claim 7, wherein identifying discrepancies between the order of markers of the first digitally-encoded speech representation and the order of markers of the second digitally-encoded speech representation further comprises:

identifying which of the plurality of expected utterances do not have a corresponding one of the plurality of actual utterances; and identifying which of the plurality of expected utterances have multiple corresponding ones of the plurality of actual utterances.

9. The method according to claim 7, wherein the order of markers of first digitally-encoded speech representation comprises an expected order of the plurality of expected utterances, the order of markers of second digitally-encoded speech representation comprises an actual order of the plurality of actual utterances, and the method further comprises identifying discrepancies between the expected order and the actual order.

10. The method according to claim 1, further comprising calculating a duration of at least one of the plurality of sections.

11. A computing system for processing natural language, the system comprising:

at least one electronic processor; and a non-transitory computer-readable medium storing instructions that, when executed by the at least one electronic processor, cause the at least one electronic processor to perform operations comprising:

obtaining a first digitally-encoded speech representation corresponding to an agent script for a telecommunication interaction, obtaining a second digitally-encoded speech representation corresponding to a voice recording of the telecommunication interaction, generating a similarity structure based on the first digitally-encoded speech representation and the second digitally-encoded speech representation, the similarity structure representing a degree of semantic similarity between the first digitally-encoded speech representation and the second digitally-encoded speech representation, matching at least one first marker in the first digitally-encoded speech representation to at least one second marker in the second digitally-encoded speech representation based on the similarity structure, wherein matching further comprises identifying discrepancies between an order of markers of first digitally-encoded speech representation and an order of markers of second digitally-encoded speech representation, and dividing the telecommunication interaction into a plurality of sections based on the matching.

12. The system according to claim 11, wherein obtaining the first digitally-encoded speech representation includes applying a machine learning algorithm to the agent script to generate the first digitally-encoded speech representation, wherein the first digitally-encoded speech representation is a first numeric vector having a predetermined size.

13. The system according to claim 12, wherein obtaining the second digitally-encoded speech representation includes:

generating a transcript from the voice recording; and applying the machine learning algorithm to the transcript to generate the second digitally-encoded speech representation, wherein the first digitally-encoded speech representation is a second numeric vector having the predetermined size.

14. The system according to claim 13, wherein generating the similarity structure includes applying a vector operation to the first numeric vector and the second numeric vector, thereby to generate a similarity matrix including a plurality of matrix elements.

15. The system according to claim 14, wherein matching the at least one first marker to the at least one second marker includes:
- comparing the plurality of matrix elements to a predetermined similarity threshold value; and
- discarding respective ones of the plurality matrix elements which are less than the similarity threshold value.

16. The system according to claim 15, wherein dividing the telecommunication interaction into the plurality of sections includes:
- applying a clustering algorithm to each of the plurality of matrix elements which have not been discarded; and
- generating at least one section start timestamp and at least one section stop timestamp.

17. The system according to claim 11, wherein obtaining the first digitally-encoded speech representation includes retrieving a predetermined numeric vector from a memory of the system, the numeric vector including a plurality of elements respectively corresponding to subsections of the agent script.

18. The system according to claim 11, wherein the first digitally- encoded speech representation includes a first plurality of embeddings respectively corresponding to a plurality of expected utterances in the telecommunication interaction, and the second digitally-encoded speech representation includes a second plurality of embeddings respectively corresponding to a plurality of actual utterances in the telecommunication interaction.

19. The system according to claim 18, wherein identifying discrepancies between the order of markers of the first digitally-encoded speech representation and the order of markers of the second digitally-encoded speech representation further comprises:
- identifying which of the plurality of expected utterances do not have a corresponding one of the plurality of actual utterances; and
- identifying which of the plurality of expected utterances have multiple corresponding ones of the plurality of actual utterances.

20. The system according to claim 11, the operations further comprising calculating a duration of at least one of the plurality of sections.

* * * * *